US006944988B2

(12) United States Patent
Gilbert

(10) Patent No.: US 6,944,988 B2
(45) Date of Patent: Sep. 20, 2005

(54) BOUQUET CONTAINER

(75) Inventor: Scott R. Gilbert, Hinckley, OH (US)

(73) Assignee: Professional Package Company, Inc., Strongsville, OH (US)

( * ) Notice: Subject to any disclaimer, the term of this patent is extended or adjusted under 35 U.S.C. 154(b) by 72 days.

(21) Appl. No.: 09/876,799

(22) Filed: Jun. 7, 2001

(65) Prior Publication Data

US 2001/0049903 A1 Dec. 13, 2001

Related U.S. Application Data

(60) Provisional application No. 60/210,369, filed on Jun. 9, 2000.

(51) Int. Cl.[7] ................................................ A47G 7/02
(52) U.S. Cl. ..................................................... 47/41.01
(58) Field of Search ......................... 47/41.01; 206/423, 206/774, 494; 229/76, 79, 80, 80.5, 87.01, 87.08, 87.03, 87.05, 92.1, 92.7; 426/115, 122, 123

(56) References Cited

U.S. PATENT DOCUMENTS

| 131,855 | A | * | 10/1872 | Crandal | .................. | 15/247 |
|---|---|---|---|---|---|---|
| 272,852 | A | * | 2/1883 | Breen | ...................... | 229/68.1 |
| 892,074 | A | * | 6/1908 | Obici | ........................ | 206/811 |
| 943,389 | A |  | 12/1909 | Cockrell |  |  |
| 1,603,207 | A | * | 10/1926 | Huston | ................... | 206/459.5 |
| 1,672,658 | A | * | 6/1928 | Shaffer et al. | ............... | 206/494 |
| 3,172,796 | A | * | 3/1965 | Gulker | ......................... | 156/269 |
| 3,448,915 | A | * | 6/1969 | Schwarzkopf | ................ | 229/69 |
| 4,091,925 | A | * | 5/1978 | Griffo et al. | ................. | 206/423 |
| 4,784,864 | A |  | 11/1988 | Ikeda | ........................... | 426/115 |
| 5,557,882 | A | * | 9/1996 | Weber | ......................... | 206/423 |
| 5,595,298 | A | * | 1/1997 | Straeter | ....................... | 206/423 |
| 5,624,320 | A | * | 4/1997 | Martinez | ..................... | 206/423 |
| 5,647,168 | A | * | 7/1997 | Gilbert | ........................ | 383/120 |
| 5,899,047 | A | * | 5/1999 | Weder et al. | ................ | 206/423 |
| 5,966,866 | A | * | 10/1999 | Ferguson | ..................... | 206/423 |
| 5,966,869 | A | * | 10/1999 | Weder | ......................... | 206/423 |
| 6,129,208 | A | * | 10/2000 | Ferguson | ..................... | 206/423 |

FOREIGN PATENT DOCUMENTS

| CH | 393 176 | 5/1965 |
|---|---|---|
| FR | 1432770 | 3/1966 |
| FR | 2036163 | 3/1969 |
| FR | 2651663 | 9/1989 |
| IT | 224507 | 4/1996 |

OTHER PUBLICATIONS

"A World of Cut Flower and Pot Plant Packaging" Brochure, Kerk's Plastic Products Manufacturing, Inc., published prior to our earliest filing date.

\* cited by examiner

Primary Examiner—Son T. Nguyen

(57) ABSTRACT

A plant container including a receptacle having a top opening for insertion of a plant therein and a top flap for selective folding over the top opening to cover the receptacle. A stack of these containers may be compactly stored in a collapsed flat state and then individual containers expanded upon purchase of plant. The containers may be made from panels having a right triangular shape so that may be mass produced in such a manner that wasted web material is minimized.

29 Claims, 7 Drawing Sheets

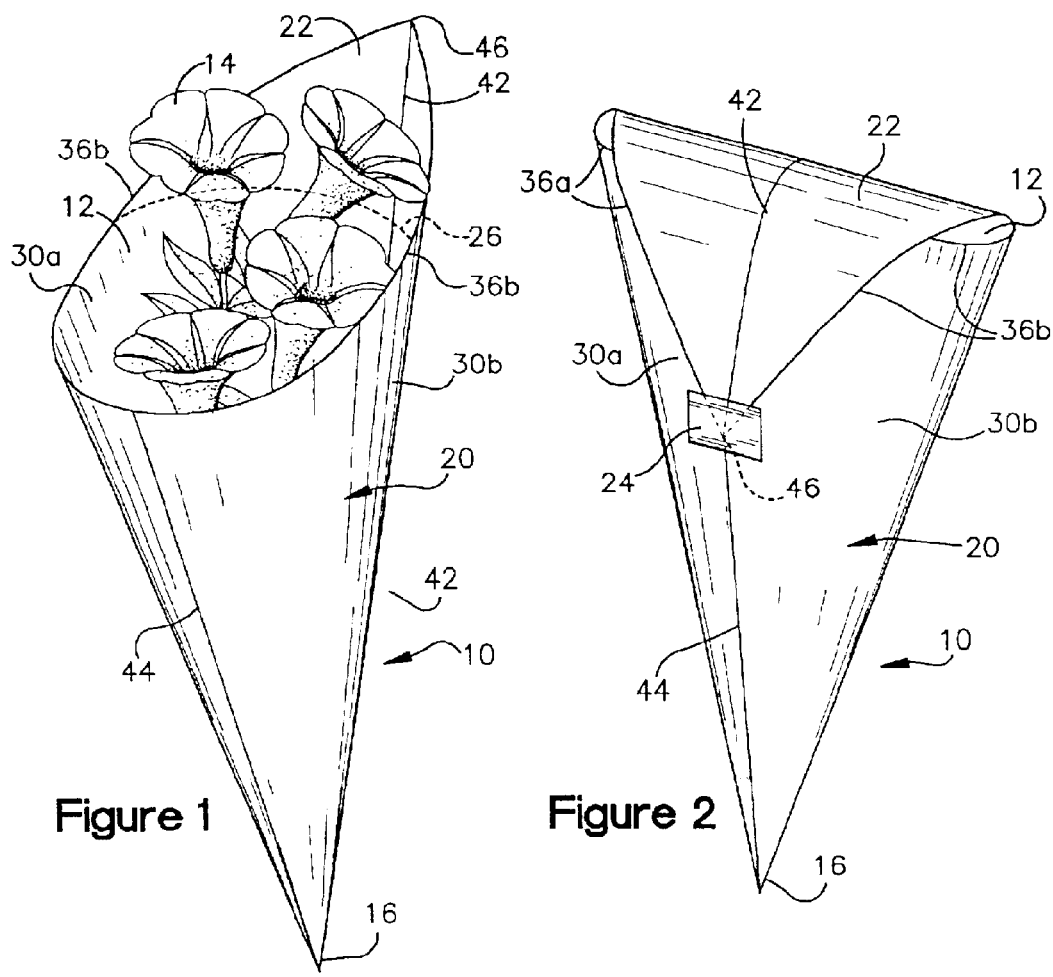
Figure 1    Figure 2
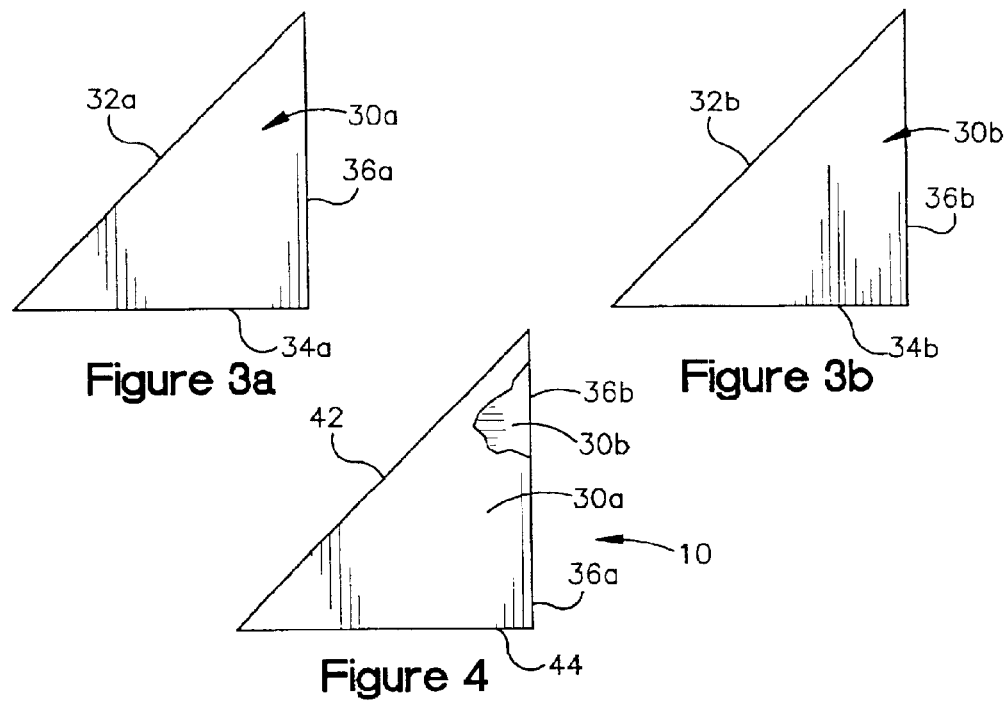
Figure 3a    Figure 3b
Figure 4

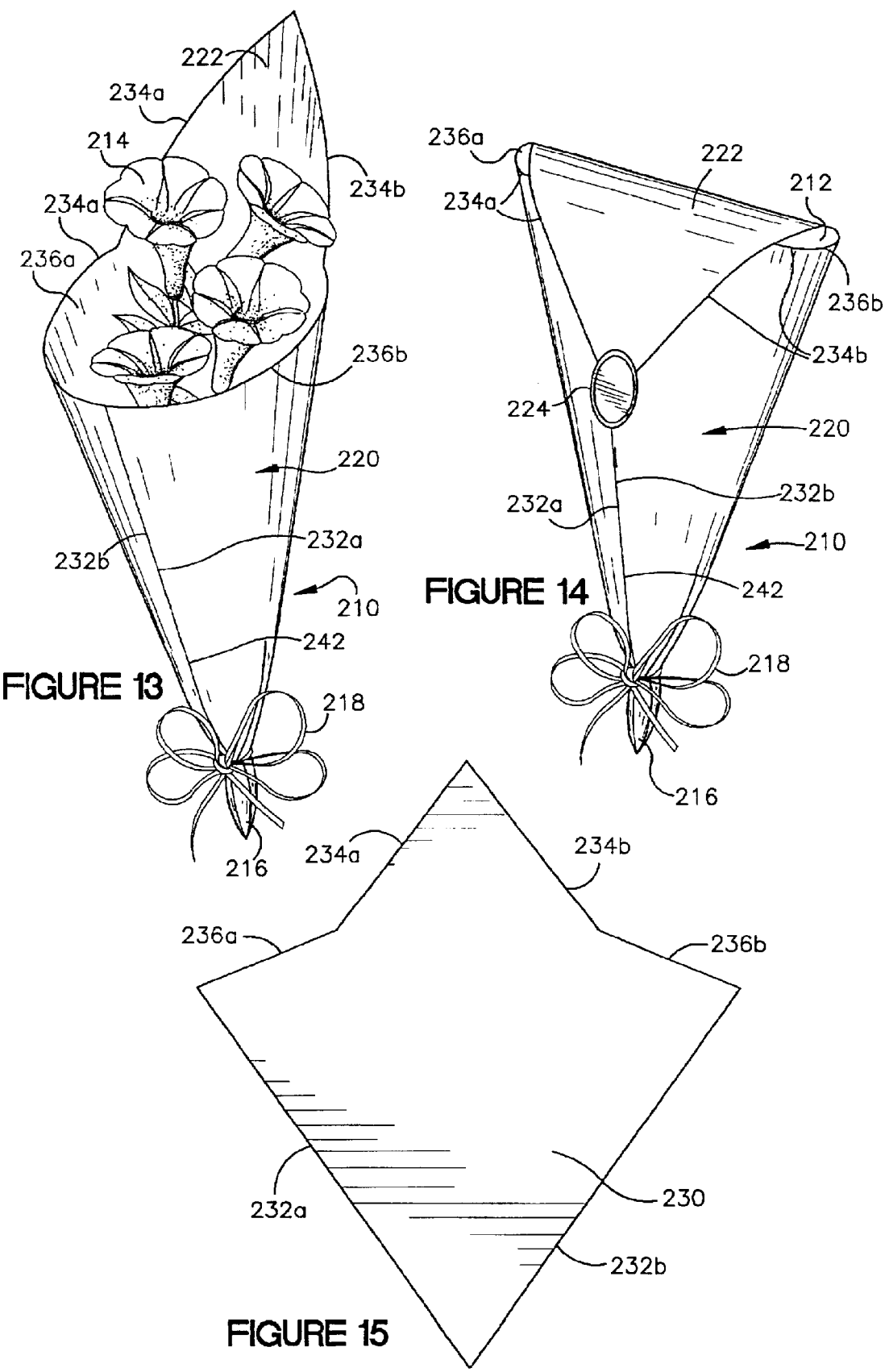

BOUQUET CONTAINER

FIELD OF THE INVENTION

The present invention relates generally to a bouquet container and more particularly to a container including a receptacle for a bouquet and a top flap for selectively covering the bouquet's blossoms and buds so that flowers purchased, for example, at a self-serve station may be wrapped in an attractive container resembling that provided by a professional florist.

BACKGROUND OF THE INVENTION

When a bouquet of flowers is purchased at a floral shop or stand, a professional florist usually wraps the flowers for the purchaser. For example, the florist places the bouquet on a flat sheet of material (paper, plastic, foil, etc.) and the lateral edges of the sheet are wrapped around the bouquet and then held in place with a piece of tape or decorative seal. Since the florist repeatedly performs such a bouquet-wrapping process, the positioning, folding, and sealing of the material becomes a somewhat routine and non-demanding task. Also, the sheets of wrapping material are easily stored in a flat pile or, alternatively, easily cut from a roll of material. By careful wrapping, a florist can provide a pleasing and professional appearance to the flowers.

When a bouquet is purchased from a self-serve stand (such as at a grocery store), it is usually the responsibility of the purchaser to wrap the bouquet. Generally, consumers do not have the skill, time, patience, and/or desire to use the bouquet-wrapping techniques used by professional florists. Containers are therefore commonly provided at the point-of-purchase. The containers are usually stored in a collapsed or flat condition to conserve space. The flat container is opened by the purchaser and the bouquet is placed inside. The containers do not have any way to cover the top of the bouquet when it extends above the upper edge of the container's open top. Moreover, these point-of-purchase containers often resemble the plastic grocery store bags used in the bulk food section and usually do not complement the flowers with a pleasing and professional appearance.

Accordingly, the inventor appreciated that a need remained for a consumer-friendly floral container which may be used by purchasers to wrap their flowers while at the same time providing the pleasing appearance of a florist-wrapped bouquet.

SUMMARY OF THE INVENTION

The present invention provides a container having a receptacle for a bouquet and a top flap of sufficient dimensions to fold over the top of the bouquet to close the receptacle. The closure protects the bouquet's blossoms (flowers), buds and foliage, and provides an attractive and secure package. The consumer-friendly floral container of the present invention may be used by a purchaser to wrap flowers while at the same time providing the pleasing appearance of a florist-wrapped bouquet.

More particularly, the present invention provides a plant or bouquet container comprising a receptacle having a top opening for receiving a plant or bouquet therein and a top flap of sufficient dimensions to allow it to cover a plant or bouquet placed within. The receptacle has an upper edge defining the top opening wherein the flap extends at least six inches, at least seven inches, at least eight inches, at least nine inches, at least ten inches, at least eleven inches, and/or at least twelve inches above a portion of the receptacle's upper edge. The height of the top flap is at least 25%, at least 30%, at least 35%, and/or at least 40% of the height of the receptacle.

The containers of the present invention may be mass produced in such a manner that wasted web material is minimized. For example, the container may be formed by two flat, flexible panels sealed together along two adjacent edges, and each of the panels forms half of the receptacle and half of the top flap. The panels are preferably made of a suitable film material such as polyolefins, polyethylene, polypropylene, polyesters, polyethylene-terephthalate, and/or nylons.

The panels may be shaped so that the receptacle has a frustoconical shape and the top flap has a triangular or peaked shape when the container is in its open or expanded state. Also, the panels may lay flat against each other when the container is in a closed or collapsed state. A series of these containers may be aligned and stacked in a pack and thereby compactly stored until ready for use at a floral stand or shop.

The panels may have the same triangular shape and, more particularly have a right triangular shape and, even more particularly, have a right isosceles triangular shape. If the panels have a right triangular shape (isosceles or otherwise), each panel includes a hypotenuse edge and two mutually perpendicular edges. The panels are joined together (such as by a seam and more particularly by an essentially permanent watertight seam) along their hypotenuse edges and along one of their perpendicular edges.

When the container is opened, the seam joining the perpendicular edges extends centrally through the receptacle's front portion and the seam joining the hypotenuse edges extends centrally through the receptacle's rear portion and the top flap. The panels' unjoined edges define the edges of the container's open top and the edges of the top flap. When the container is collapsed, the corresponding edges of the panels form the outer edges of the collapsed container so that, when closed, the container is triangular.

To make containers according to the present invention, first and second webs of a suitable film are overlaid. Essentially permanent and substantially watertight seams are then formed between the first and second webs corresponding to the desired shape of the panels and the so-seamed webs are divided into separate containers. Preferably, the seam-forming steps are performed substantially simultaneously with the dividing steps by hot wires and/or hot dies. In any event, the containers may be aligned and stacked in a collapsed state to form a pack for use by a florist shop or stand.

When the preferred right triangle panel shape (isosceles or otherwise) is used, the seams may be formed so that very little or no web material is wasted. Particularly, webs are provided which have a width corresponding the length of the unjoined perpendicular sides of the panels plus the width of a header. Successive diagonal seams are formed across the webs cutting the webs on the bias as they advance. The individual bias cuts are separated by a distance equal to width of the panels. Transverse seams are then formed between adjacent diagonal seams to form two containers between each pair of diagonal seams. Perforations between the header and the balance of the container may be made before or after the seam forming operations.

To put a bouquet in a container, the container (which is stored in its collapsed state) is torn from the header and opened to form the receptacle for the bouquet. The bouquet is put into the container's top opening, and the top flap is folded over the opening to protect the bouquet's flowers and buds. The top flap may be secured in its folded position by, for example, taping it to a front portion of the receptacle. Very advantageously, a retailer may provide the containers so that a consumer at the point-of-purchase of the bouquet can open the container and place the bouquet inside. A dispenser may be located near the bouquet selection site for storage of the flat containers. The dispenser may comprise one or more hooks which pass through holes in the headers to hang a pack of the containers for easy access by a florist or consumer.

These and other features of the invention are fully described and particularly pointed out in the claims. The following description and drawings set forth in detail certain illustrative embodiments of the invention; the embodiments being indicative of but a few of the various ways in which the principles of the invention may be employed.

DRAWINGS

FIG. 1 is a perspective view of a container 10 according to the present invention, the container 10 being shown in an open condition.

FIG. 2 is a perspective view of the container 10 in a closed condition.

FIGS. 3a and 3b are front views of panels used to form the container 10.

FIG. 4 is a front view of the container 10 in a flattened condition.

Figures 11A, 11B, 12:
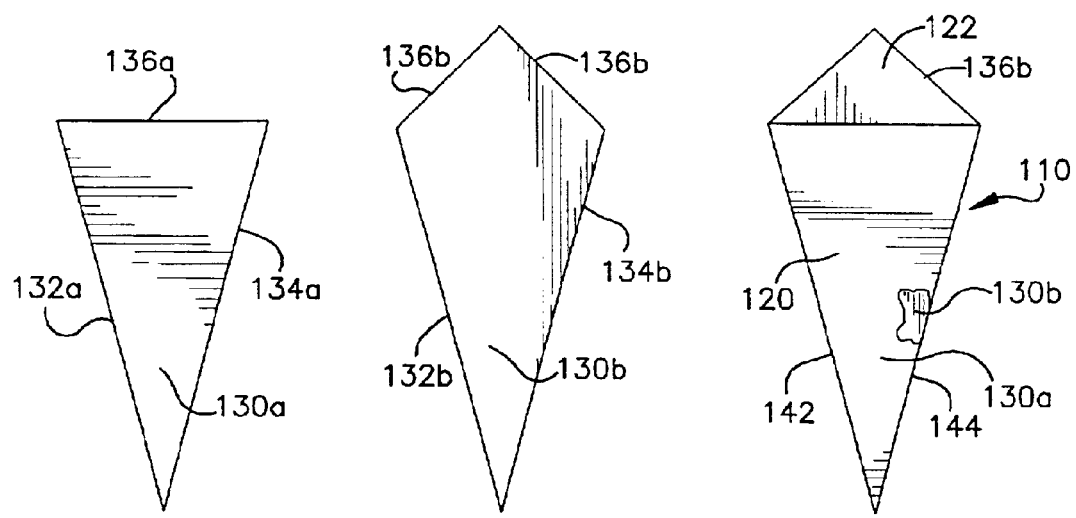

FIGS. 11a and 11b are front views of panels 130a and 130b used to form the container 110.

FIG. 12 is a front view of the container 110 in a flattened condition.

FIG. 13 is a perspective view of a container 210 according to another embodiment the present invention, the container being shown in an open condition.

FIG. 14 is a perspective view of the container 210 in a closed condition.

FIG. 15 is a front view of a panel used to form the container 210.

DETAILED DESCRIPTION

Referring now to the drawings, FIGS. 1 and 2 show a container 10 according to the present invention. When the container 10 is opened as shown in FIG. 1, a bouquet 14 may be put into the container through its open top 12. Once the bouquet 14 is placed in the container 10, the container may be closed as shown in FIG. 2 to protect the flowers, buds and foliage of the bouquet 14. The bottom end 16 of the container 10 may be open or closed.

The container 10 may conveniently be considered as including a receptacle 20 and a top flap 22. The receptacle 20 and top flap 22 are separated only by a fold line located approximately along dashed line 26 in FIG. 1. The receptacle 20 has a conical shape and its top front edge partially defines the open top 12 of the container 10. The bottom end of the receptacle 20 forms the bottom end 16 of the container 10 and may be closed (as shown) or open.

The top flap 22 has a roughly triangular shape. In the open position shown in FIG. 1, the top flap 22 extends upward from the fold line 26 at their upper rear edges of the receptacle 20 and defines the rear section of the open top 12 of the container 10. In the closed position shown in FIG. 2, the top flap 22 is folded along fold line 26 over the container's top opening and secured to the front of the receptacle by, for example, a piece of tape 24.

The top flap 22 is large enough to allow it to be folded over the container's top opening and secured to the front of the receptacle. Particularly, the top flap 22 has a height (measured as the difference between the length of the front seam 44 and back seam 42) of at least six inches, at least seven inches, at least eight inches, at least nine inches, at least ten inches, at least eleven inches, and/or at least twelve inches, and this height is at least equal to 25% of the height of the receptacle 20, at least 30% of the height of the receptacle 20, at least 35% of the height of the receptacle 20, and/or at least 40% of the height of the receptacle 20, all depending on the size of the bouquet or plant for which the container is intended.

The receptacle 20 and the top flap 22 are formed by a pair of panels 30a and 30b shown in FIGS. 3a and 3b. The panels 30a and 30b may be transparent, translucent, or opaque and/or printed or plain. They are preferably made from a film that is, for example, 0.5 mil to 10 mil thick, for example 1.6 mil thick of 2.0 mil thick. The panels 30a and 30b may be treated (i.e., printed) with a high-gloss ink on one surface, these treated surfaces preferably forming the exterior of the container 10. Suitable films include polyolefins (particularly polyethylene and polypropylene), polyesters (particularly polyethylene-terephthalate), and nylons. Further, the panels 30a and 30b may be formed from a single layer of sheet material as shown, or one or both of them may be formed of two or more layers to achieve a multi-walled container. Various aesthetic effects can be achieved. For example, an outer layer may be partially or wholly transparent so as to reveal at least partially the adjacent layer.

The panels 30a and 30b preferably have the same right triangular shape so that their edges 32a and b, 34a and b, and 36a and b correspond to each other. In the illustrated embodiment, the panels 30a and 30b have a right isosceles triangular shape. Accordingly, the panel 30a includes a hypotenuse side 32a and sides 34a and 36a (FIG. 3a) and the panel 30b includes a hypotenuse side 32b and sides 34b and 36b (FIG. 3b). When the container 10 is in a flattened or collapsed state, as is shown in FIG. 4, the panels 30a and 30b lie flat against each other and are attached together along their hypotenuse edges 32a and 32b by a seam 42 and along their perpendicular edges 34a and 34b by a seam 44.

Referring now back to FIGS. 1 and 2, the receptacle 20 and flap 22 develop when the container 10 is opened from the closed, flat state in which it is manufactured. As the two seams 42 and 44 are brought toward each other, the lower portion assumes a cone shape to form the receptacle 20. The top edge (defined by the edges 36a and 36b) open to an almond shape when viewed from above. As the tip 46 of the top edge is folded over toward the front seam 44, the fold line 26 across the back forms and the opening of the top flattens some. At that point tip 46 can be taped in place as shown in FIG. 2. Accordingly, when the container 10 is in its expanded state, the panel 30a forms the left-hand half of the receptacle 20 and the left-hand half of the flap 22, that is, the sections to the left of seams 42 and 44. Similarly, the panel 30b forms the right-hand half of the receptacle 20 and the right-hand half of the flap 22, that is, the sections to the right of seams 42 and 44. The unattached or unseamed sides 36a and 36b form the edges of the container's open top 12 and the outer edges of the top flap 22.

Figure 5:
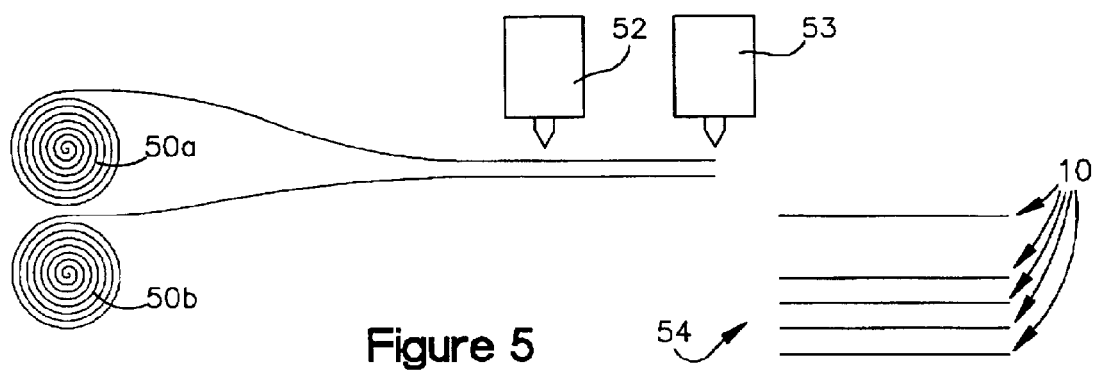
FIG. 5 is a schematic side view of a method of making a plurality of the bouquet containers 10.

A preferred method of making the bouquet container 10 is schematically shown in FIG. 5. In this method, two webs 50a and 50b are provided and each of the webs has a width equal to the desired length of the panels' joined perpendicular edges 34a and 34b plus the width of a header 48. The webs 50 preferably each have a treated (i.e., printed) surface and an untreated surface and are positioned to overlay each other with their untreated surfaces facing each other and off set by the width of the header 48. The webs 50 are then intermittently advanced, in timed sequence, to sealing bars 52 and 53. The sealing bars 52 and 53 mount hot wires or hot dies that form the seams 42 and 44, respectively, and simultaneously divide the supported webs into a plurality of containers 10. These containers 10 are collected in a mass, typically in a pack 54 in which the containers 10 are similarly aligned and stacked for use by a florist shop or stand.

The seams 42 and 44 created by the sealing stations are preferably leak-resistant and/or are preferably essentially water tight, permanent seams. In the context of the present invention, an "essentially permanent seal" refers to a heatseal, weld, or any other appropriate type of seam which cannot be disrupted without damaging the film adjacent to the weld or without incurring a high risk of doing so. Further details of suitable methods for effecting such essentially permanent seams are disclosed in U.S. Pat. No. 5,647,168, the entire disclosure of which is hereby incorporated by reference.

Figure 6A:
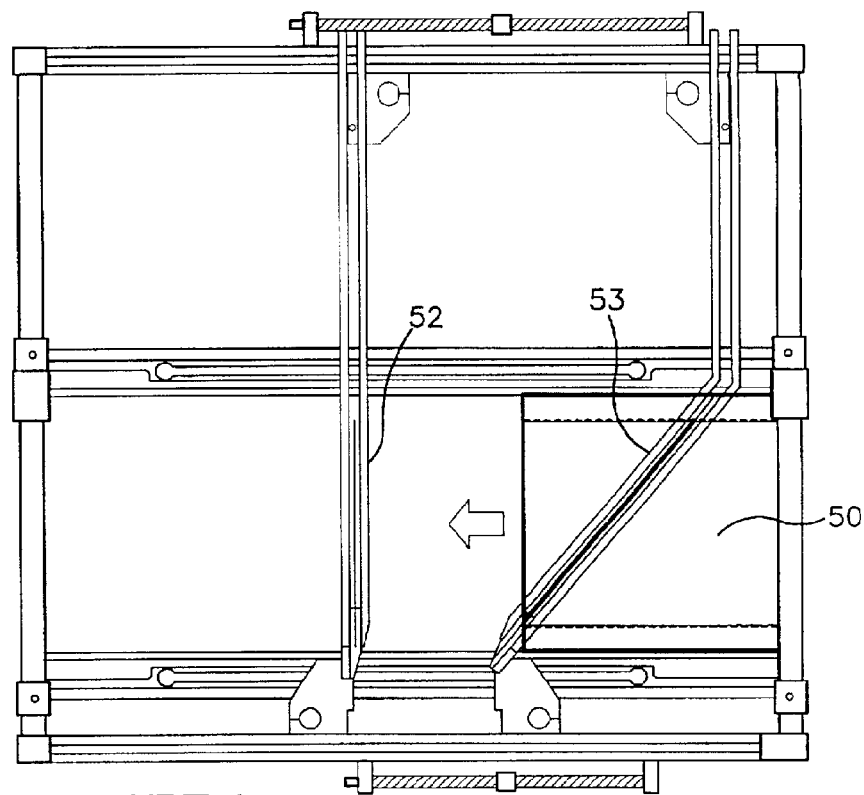
FIGS. 6a–6d are top schematic views showing the preferred sequential placement of seams during the container-making method.
Figure 6B:
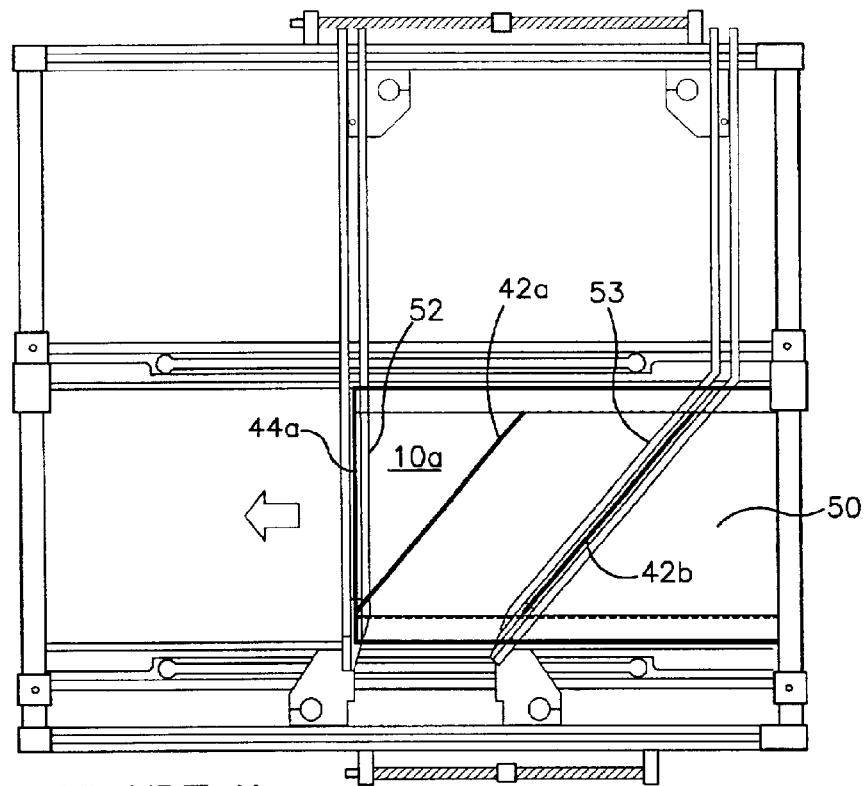

When the preferred right triangle panel shape (isosceles or otherwise) is used, the seams 42 and 44 may be placed so that a minimum of web material is wasted during the container-making process as is best shown in FIGS. 6a and 6b. Particularly, the seams 44 are placed perpendicular to the direction of movement of the webs 50a and 50b. The seams 42 are diagonally placed between adjacent transverse seams 44 to form two containers 10 therebetween.

In the illustrated seaming process, the sealing bars 52 and 53 are positioned to form the containers 10 which are right isosceles triangles. To make trapezoidal shaped floral containers (wherein one web forms the front of the receptacle and the other web forms the rear of the receptacle), the bars 52 and 53 would be slanted towards each other to form the desired trapezoidal shape. According to the present invention, the trailing sealing bar 52 is positioned so that it is transverse to the web direction and the leading sealing bar 53 is positioned to that is slanted in a 45° angle in the web direction. The nearest ends of the sealing bars 52 and 53 (the bottom ends in the illustrated views) are separated from each other by a distance (measured in the direction of web travel) equal to the length of the unjoined edge of the panel 10.

Figure 6C:
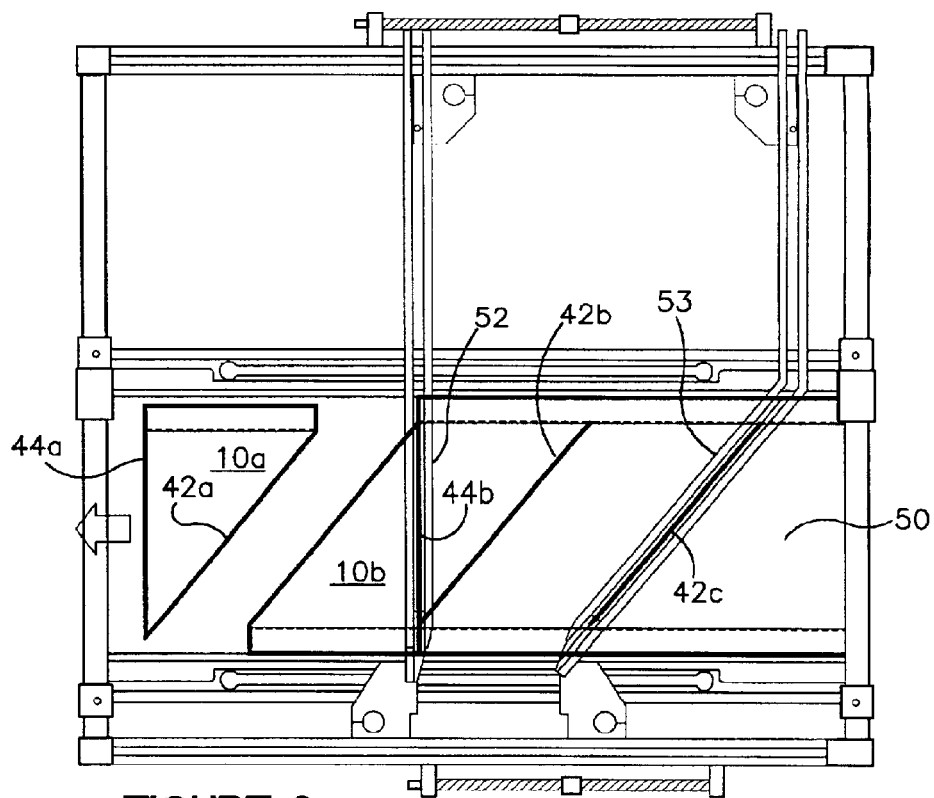
Figure 6D:
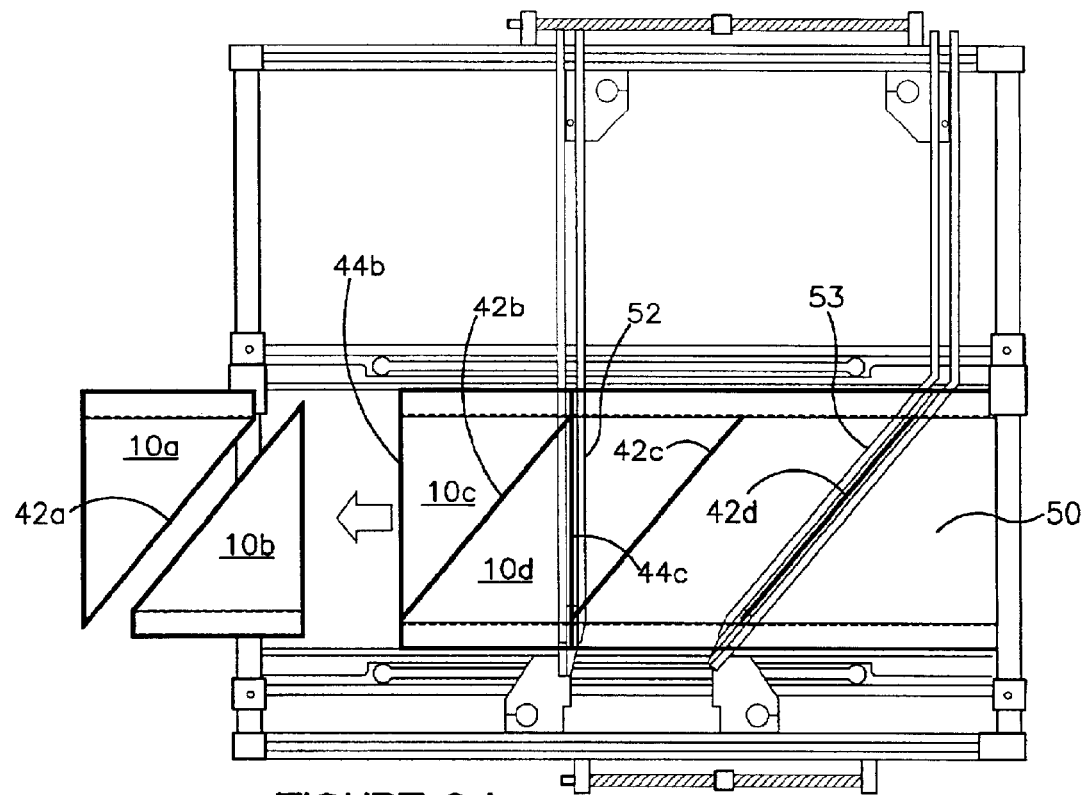

In the illustrated seaming process, the sealing bar 53 initially is pressed downward and forms a first slanted seam 42a across the width of the web 50 as shown in FIG. 6a. Then the web 50 advances a distance equal to the length of the unsealed edges 36b (FIGS. 1, 3, and 4). Next, the sealing bar 53 forms a second slanted seam 42b and simultaneously the sealing bar 52 forms a first transverse seam 44a. (FIG. 6b.) The process is repeated to form successive containers. FIGS. 6c and 6d.

Transverse seam 44a intersects the seam 42a and so forms a sealed bottom to the container 10. If an open bottom container is desired, then the spacing between sealing bars 52 and 53 is increased. This leaves an opening in the bottom of the container.

In some manufacturing processes the headers 48 located at the top and bottom are used to advance the webs 50a and 50b under the sealing bars 52 and 53. In this case an opposing pair of endless belts may grip the edges of the webs to propel them through the machine. These belts may prevent either of the sealing bars 52 and 53 from extending the full width of the webs. In such a case appropriately spaced notches may be cut in the margins of the web up stream of the sealing bars. The notches serve to complete the cuts truncated by the presence of the belts.

As noted above the webs 50a and 50b, which form the container 10, are superimposed prior to being cut, and are offset by the width of the header 48. In addition, a line of perforations 55 (best shown in FIGS. 7a, b, and c) is formed in the webs to allow easy separation of the header. The perforations may be made before or after the containers pass the sealing bars 52 and 53 and are made by conventional means.

One may now appreciate that the container 10 of the present invention provides a receptacle 20 for a bouquet 14 and a top flap 22 for protection of the bouquet's flowers and buds. The container 10 may be compactly stored at a point-of-purchase floral stand in a collapsed state and then expanded for use upon purchase of a bouquet. Storage and dispensing of the containers 10 may be facilitated by a bouquet wrapping system, such as the system 80 shown schematically in FIGS. 7a—7a. The system 80 is particularly suited for consumer use at a help-yourself floral stand, such as at a grocery store. However, the containers 10 and/or the system 80 may also be used by a professional florist and situated behind the counter.

Figures 7A, 7B:
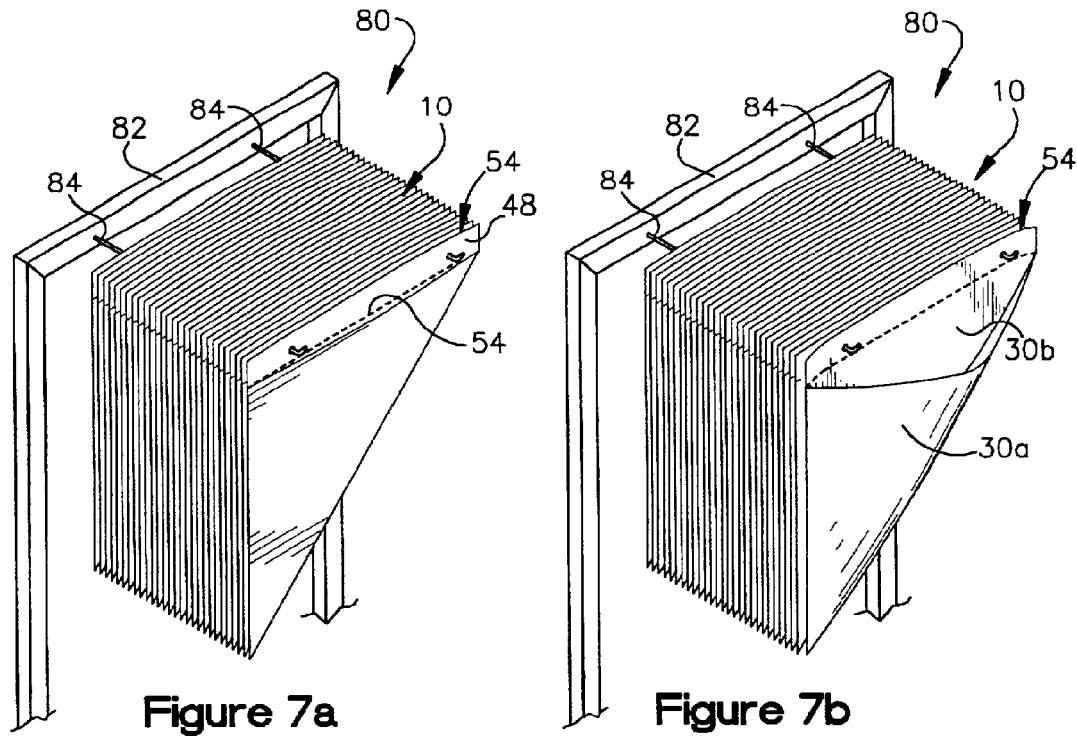
FIGS. 7a–7d are schematic views of a bouquet wrapping system according to the present invention.

The system 80 includes a stand 82 on which a pack 54 of the containers 10 are hung for easy access. (FIG. 7a.) In the illustrated system 80, the stand 82 includes a pair of hooks 84 and each of the containers 10 in the pack 54 includes a removable strip or header 86. The header 86 has two openings for insertion of the stand's hooks 84 therethrough and is removably attached to the unjoined perpendicular edge 36b of the panel 30b.

Figures 7C, 7D:
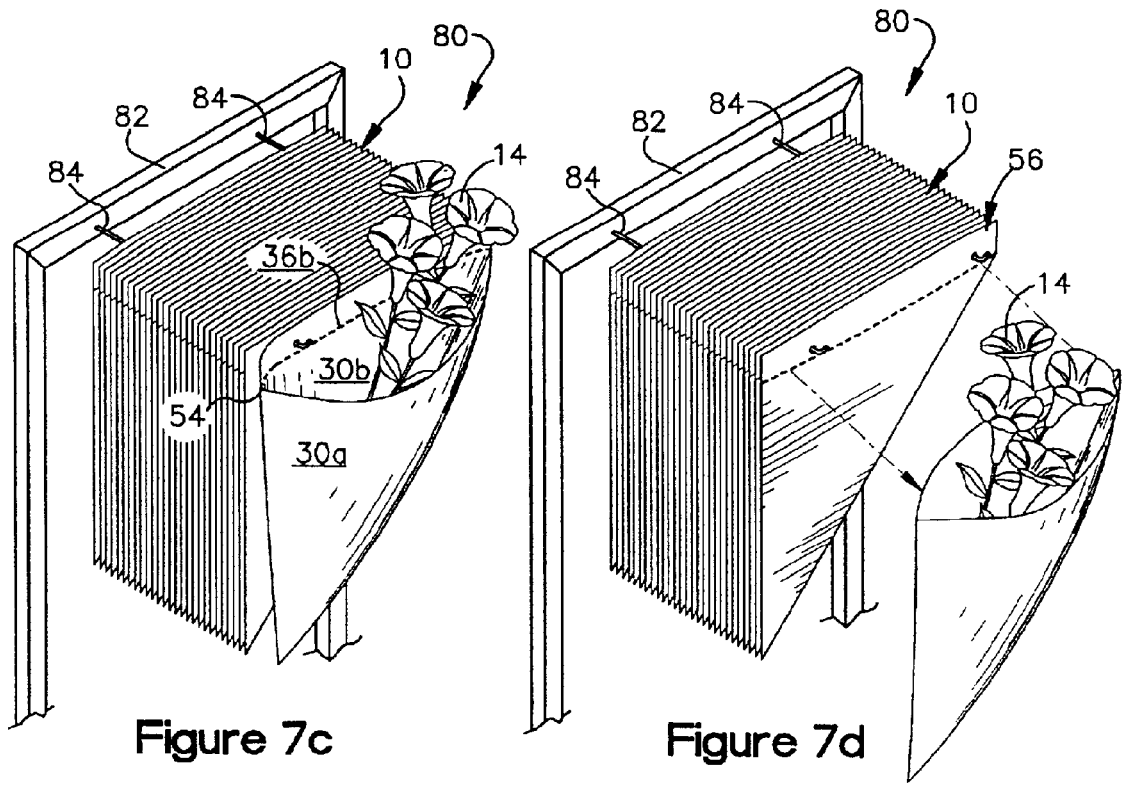

When a bouquet 14 is to be wrapped, the front-facing panel 30a is pulled forward to expand the container 10. (FIG. 7b.) The bouquet is then inserted into the open top 12 of the container and dropped into the receptacle 20. (FIG. 7c.) If the bouquet 14 has a front and back side, its back side should be placed adjacent the hypotenuse seam 42 rather than the perpendicular seam 44 so that bouquet 14 will be properly oriented in the container 10. The container 10 is then pulled forward relative to the stand 82 thereby detaching from the strip 86. (FIG. 7d.) The cover flap 22 may then be folded over the container's top opening and secured to the front of the receptacle 20 by, for example, tape 24. (See FIGS. 1 and 2.)

Figure 8:
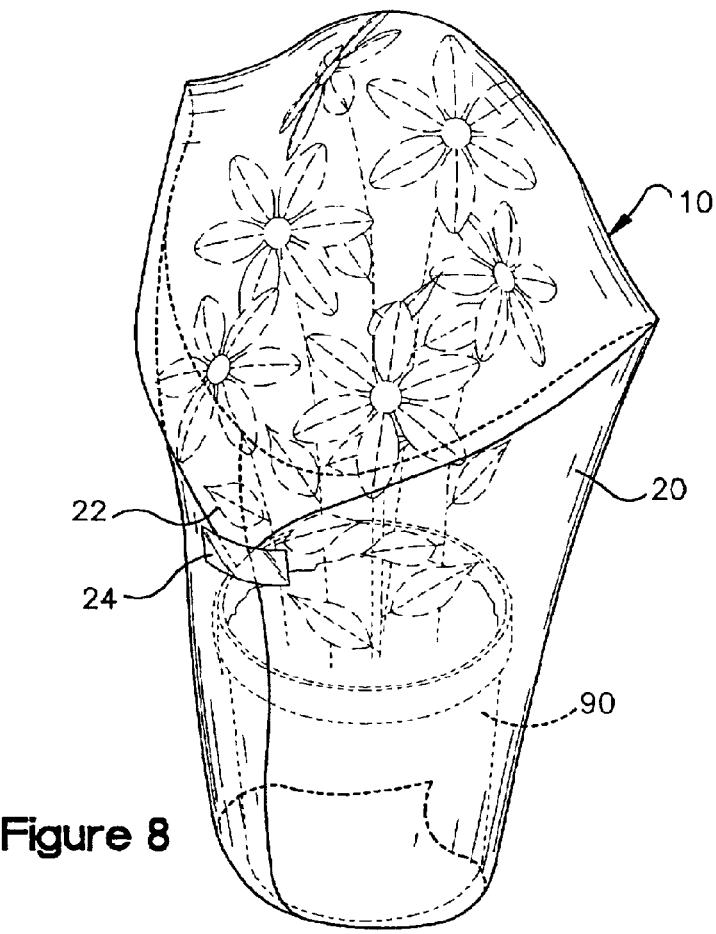
FIG. 8 is a perspective view of the container 10 used to hold a potted plant instead of a bouquet.

In addition to bouquets 14, the container 10 may also be used to wrap a potted plant 70 as is shown in FIG. 8. When used in this manner, the bottom conical end portion of the receptacle 20 is crushed or folded against the flat bottom of the potted plant 70. The cover flap 22 is folded over the plant and secured to the front of the receptacle by, for example, tape 24.

Figure 9:
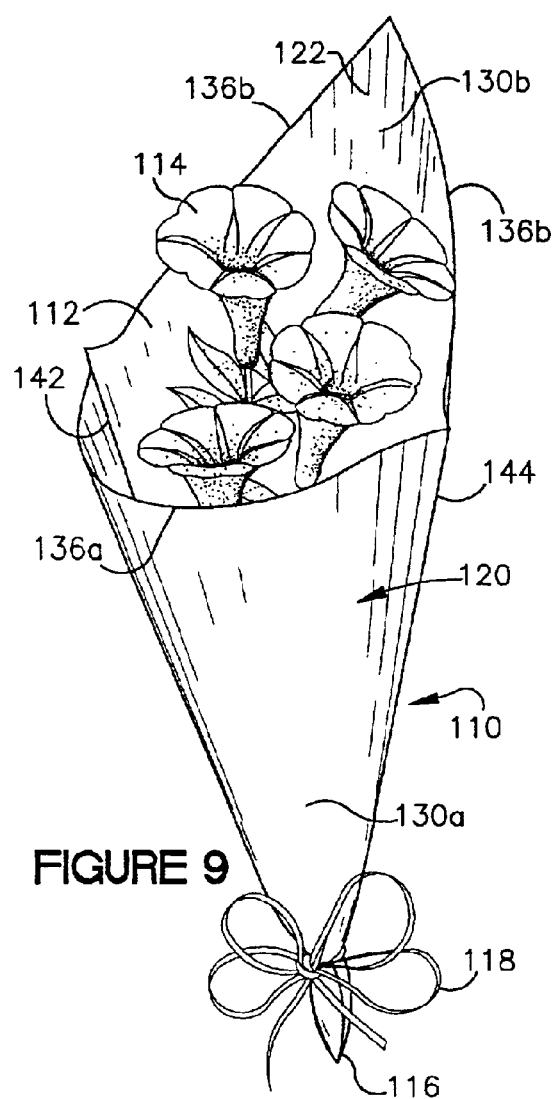
FIG. 9 is a perspective view of a container 110 according to another embodiment of the present invention, the container being shown in an open condition.
Figure 10:
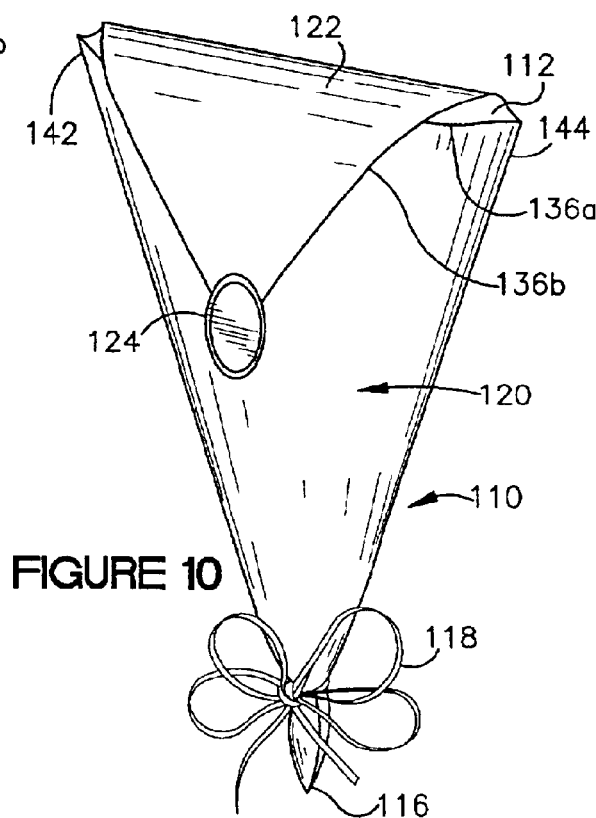
FIG. 10 is a perspective view of the container 110 in a closed condition.

Referring now to FIGS. 9 and 10, another bouquet container 110 according to the present invention is shown. When the container 110 is in the open condition shown in FIG. 9, it has an open top 112 for insertion of a bouquet 114 therein. Once the bouquet 114 is inserted, the container 110 may be placed in the closed condition shown in FIG. 10 to protect the flowers and buds of the bouquet 114. The bottom end 16 of the container 10 may be open or closed and may be secured with a ribbon 118.

The container 110 comprises a receptacle 120 and a top flap 122. The receptacle 120 has a conic shape and its top front edge partially defines the open insertion top 112 of the container 110. The bottom end of the receptacle 120 forms the bottom end 116 of the container 110 and may be opened or closed and/or may be secured with the ribbon 118.

The top flap 122 has a triangular shape and is coextensive with the upper rear edges of the receptacle 120. In the open position shown in FIG. 9, the top flap 122 extends upwardly from the upper rear edges of the receptacle 120 and defines the rear sections of the open insertion end of the container 110. In the closed position shown in FIG. 10, the top flap 122 is folded over the container's top opening and secured to the front of the receptacle by, for example, a seal 124.

Thus, the top flap 122 has dimensions sufficient to allow it to be folded over the container's top opening and secured to the front of the receptacle. Particularly, the top flap 122 has a height (measured from the upper edge 136a of the open top 112) of at least six inches, at least seven inches, at least eight inches, at least nine inches, at least ten inches, at least eleven inches, and/or at least twelve inches and this height is at least equal to 25% of the height of the receptacle 120, at least 30% of the height of the receptacle 120, at least 35% of the height of the receptacle 120, and/or at least 40% of the height of the receptacle 120.

The receptacle 120 and the top flap 122 are formed by a pair of panels 130a and 130b shown in FIGS. 11a and 11b. The panels 130a and 130b may be formed of the same material as the panels 30a and 30b discussed above. The panel 130a has an isosceles triangular shape and thus has equal lateral sides 132a and 134a and a third size 136a. The panel 130b has diamond shape with bottom lateral sides 132b and 134b and top sides 136b. When the container 110 is in a flattened or collapsed state, as is shown in FIG. 12, the panels 130a and 130b lie flat against each other and are attached together along their edges 132a and 132b by seam 142 and along their edges 134a and 134b by seam 144. When the container 110 is in its expanded state, the panel 130a forms the front of the receptacle 120 and the panel 130b forms the rear of the receptacle 120 and the flap 122.

Referring now to FIGS. 13 and 14, another bouquet container 210 according to the present invention is shown. When the container 210 is in the open condition shown in FIG. 13, it has an open top 212 for insertion of a bouquet 214 therein. Once the bouquet 214 is inserted, the container 210 may be placed in the closed condition shown in FIG. 14 to protect the flowers and buds of the bouquet 214. The bottom end 216 of the container 210 may be open or closed and may be secured with a ribbon 218, for example.

The container 210 comprises a receptacle 220 and a top flap 222. The receptacle 220 has a frustoconical shape and its top front edge partially defines the open insertion top 212 of the container 210. The bottom end of the receptacle 220 forms the bottom end 216 of the container 210.

The top flap 222 has a triangular shape and is coextensive with the upper rear edges of the receptacle 220. In the open position shown in FIG. 13, the top flap 222 extends upwardly from the upper rear edges of the receptacle 220 and defines the rear sections of the open insertion end of the container 210. In the closed position shown in FIG. 14, the top flap 222 is folded over the container's top opening and secured to the front of the receptacle by, for example, a seal 224.

Thus, the top flap 222 has dimensions sufficient to allow it to be folded over the container's top opening and secured to the front of the receptacle. Particularly, the top flap 222 has a height (measured from the non-coextensive upper end of the seam 232b) of at least six inches, at least seven inches, at least eight inches, at least nine inches, at least ten inches, at least eleven inches, and/or at least twelve inches and this height is at least equal to 25% of the height of the receptacle 220, at least 30% of the height of the receptacle 220, at least 35% of the height of the receptacle 220, and/or at least 40% of the height of the receptacle 220.

The receptacle 220 and the top flap 222 are formed from a single panel 230 shown in FIG. 15. The panel 230 may be may be formed of the same material as the panels 30a, 30b, 130a, and 130b discussed above. The panel 230 has a bottom triangular shape with sides 232a and 232b, an upper triangular shape with sides 234a and 234b, and sides 236a and 236b extending between sides 232a and 234a and between sides 232b and 234b, respectively. In the completed container 210, the sides 232a and 232b are joined together in a seam 242, the sides 234a and 234b form the top flap 222, and the sides 236a and 236b form the front edge of the top opening 122.

One may now appreciate that the present invention provides a container 10/110/210 having a receptacle 20/120/220 for a plant and a top flap 22/122/222 of sufficient dimensions to fold over the top of the plant to close the receptacle. The plant container 10/110/210 of the present invention may be used, as illustrated, as a container for a bouquet 14/114/214 and/or a potted plant 90. The container 10/110/210 may be additionally or alternatively used with non-bouquet cut plants, silk flowers, dried flowers, and any other type of plant product for which a container is desired.

Although the invention has been shown and described with respect to certain preferred embodiments, it is obvious that equivalent and obvious alterations and modifications will occur to others skilled in the art upon the reading and understanding of this specification. The present invention includes all such alterations and modifications and is limited only by the scope of the following claims.

What is claimed is:

1. A plant container comprising a receptacle having a top opening, a closed bottom, and a top flap of sufficient size to cover an associated plant placed in the receptacle;

the receptacle and flap consisting essentially of a front panel and a back panel, each of the front and back panels being a right isosceles triangular shape having hypotenuse edges and two perpendicular edges, the front and back panels are essentially permanently sealed along their hypotenuse edges and along one of their perpendicular edges, wherein when the container is in its expanded state, the seam joining the hypotenuse edges extends centrally through a rear portion of the receptacle and through the top flap;

the seam joining the perpendicular edges extends centrally through a front portion of the receptacle; and the unjoined perpendicular edges partially define the receptacle's open top and outer edges of the top flap.

2. A plant container as set forth in claim 1, wherein the panels are made of at least one suitable film from the group including polyolefins, polyethylene, polypropylene, polyesters, polyethylene-terephthalate, and nylons.

3. A method of making a batch of the plant container set forth in claim 1, said method comprising the steps of:
overlaying a first web and a second web of a suitable film material;
forming essentially permanent sealing seams between the first and second webs corresponding to a desired shape of the panels, wherein the forming step includes forming transverse seams across the webs which are separated by a distance equal to the length of the unjoined edge; and forming diagonal seams between adjacent transverse seams thereby forming two containers between each pair of transverse seams; and
dividing the so-seamed webs into the containers, wherein the desired shape of the panels is a right triangular shape whereby after the forming and dividing steps each panel includes a joined hypotenuse edge, a joined perpendicular edge and an unjoined perpendicular edge.

4. A method as set forth in claim 3, wherein the panels have the same right isosceles triangle shape wherein the distance between transverse seams is substantially the same as the width of the webs.

5. A plant container comprising a receptacle having a top opening for insertion of a plant therein and a top flap selectively folded over the top opening to cover the receptacle;
wherein the container is formed from two panels, each panel having a right isosceles triangular shape, including a hypotenuse edge and two perpendicular edges, wherein the two panels are joined together by essentially permanent seams to each other along their hypotenuse and along one of their perpendicular edges
and each of the panels forms half of the receptacle and half of the top flap, wherein when the container is in its expanded state:
the seam joining the edges of the hypotenuse edges extends centrally through a rear portion of the receptacle and through the top flap;
the seam joining the edges of the perpendicular edges extends centrally through a front portion of the receptacle; and
the unjoined perpendicular edges partially define the receptacle's open top and outer edges of the top flap.

6. A plant container comprising a receptacle having a top opening, a bottom, a top flap of sufficient size to cover a plant placed in the receptacle, and a fold between the receptacle and the flap, the receptacle and flap including a front panel and a back panel, each of the front and back panels including a first edge sealed together and a second edge sealed together, the fold being transverse to the first edge and that does not intersect the second edge, the top flap comprising a portion of the first panel and the portion of the second panel folded along the fold, the fold having one end at a location between the first and second edges of the front panel and a second end at a location between the first and second edges of the back panel and passing through only one of the sealed edges, whereby the flap includes a portion of the front panel and a portion of the back panel and a portion of the one sealed edge.

7. A plant container as in claim 6 wherein the first edge has a length that is longer than a length associated with the second edge.

8. A plant container as set forth in claim 7, wherein each panel has a triangular shape.

9. A plant container as set forth in claim 8, wherein the first edge of each panel are sealed together to form a first seam and the second seam of each panel are sealed together to form a second seam.

10. A plant container as set forth in claim 9, wherein the first and second seams are essentially permanent.

11. A plant container as set forth in claim 10, wherein when the container is in its expanded state:
the first seam extends centrally through a portion of the receptacle and through the top flap; and
the second seam extends centrally through another portion of the receptacle; and unjoined perpendicular edges of the front and back panels partially define the receptacle's open top and edges of the top flap.

12. A plant container as set forth in claim 11, wherein the panels are made of a suitable film.

13. A plant container as set forth in claim 12, wherein the suitable film is selected from the group consisting essentially of polyolefins, polyethylene, polypropylene, polyesters, polyethylene-terephthalate, and nylons.

14. A plant container as set forth in claim 6, wherein the panels lay flat against each other when the container is in a collapsed state whereby the container may be compactly stored until ready for use.

15. A series of the plant containers as set forth in claim 6, wherein the containers are aligned and stacked in a pack.

16. A method of making a batch of the plant containers set forth in claim 6, said method comprising the steps of:
overlaying a first web and a second web of a suitable film material;
forming essentially permanently sealed seams between the first and second webs corresponding to the desired shape of the panels; and
dividing the so-seamed webs into the containers.

17. A method as set forth in claim 16, wherein the seam-forming and the dividing steps are performed substantially simultaneously by a hot implement.

18. A method as set forth in claim 16, further comprising the step of aligning and stacking the containers in a collapsed state to form a pack for use at a consumer site.

19. A method as set forth in claim 16, further comprising the step of similarly aligning and stacking the containers in a collapsed state to form a pack for use at a consumer site.

20. A plant container comprising a receptacle having a top opening, a bottom, and a top flap, the container being formed from a front panel and a back panel, the receptacle and top flap being formed from a portion of each of the front and back panels, each of the front and back panels including at least a first edge and a second edge, wherein the first edges of the panels and the second edges of the panels are connected to each other to form first seams and second seams, respectively, and the receptacle and flap are separated by a fold line that passes through the first seam and not the second seam.

21. The plant container of claim 20, wherein the front and back panels are triangular.

22. The plant container of claim 21, wherein the first edges and the second edges of the front and back panels are substantially permanently connected to each other.

23. A plant container as set forth in claim 22, wherein the panels are made of a suitable film.

24. A plant container as set forth in claim 22, wherein the suitable film is selected from the group consisting essentially of polyolefins, polyethylene, polypropylene, polyesters, polyethylene-terephthalate, and nylons.

25. A plant container as set forth in claim 20, wherein the panels lay flat against each other when the container is in a collapsed state whereby they may be compactly stored until ready for use.

26. A series of the plant containers as set forth in claim 20, wherein the containers are aligned and stacked in a pack.

27. A plant container as set forth in claim 20, wherein when the container is in its expanded state:

the first seam joining the first edges of the front and back panels extends centrally through a portion of the receptacle and through the top flap; and the second seam joining the second edges of the front and back panels extends centrally through another portion of the receptacle; and an unjoined edge of each of the front and back panels partially define the open top of the receptacle.

28. A method as set forth in claim 27, wherein the seam-forming and the dividing steps are performed substantially simultaneously by hot wires and/or hot dies.

29. A method of making a batch of the plant containers set forth in claim 20, said method comprising the steps of:

overlaying a first web and a second web of a suitable film material;

forming essentially permanent sealing seams between the first and second webs corresponding to the desired shape of the panels; and dividing the so-seamed webs into the containers.

* * * * *